May 24, 1955 — A. B. MODINE — 2,708,944
AIR RELIEF VALVE
Filed Sept. 15, 1949
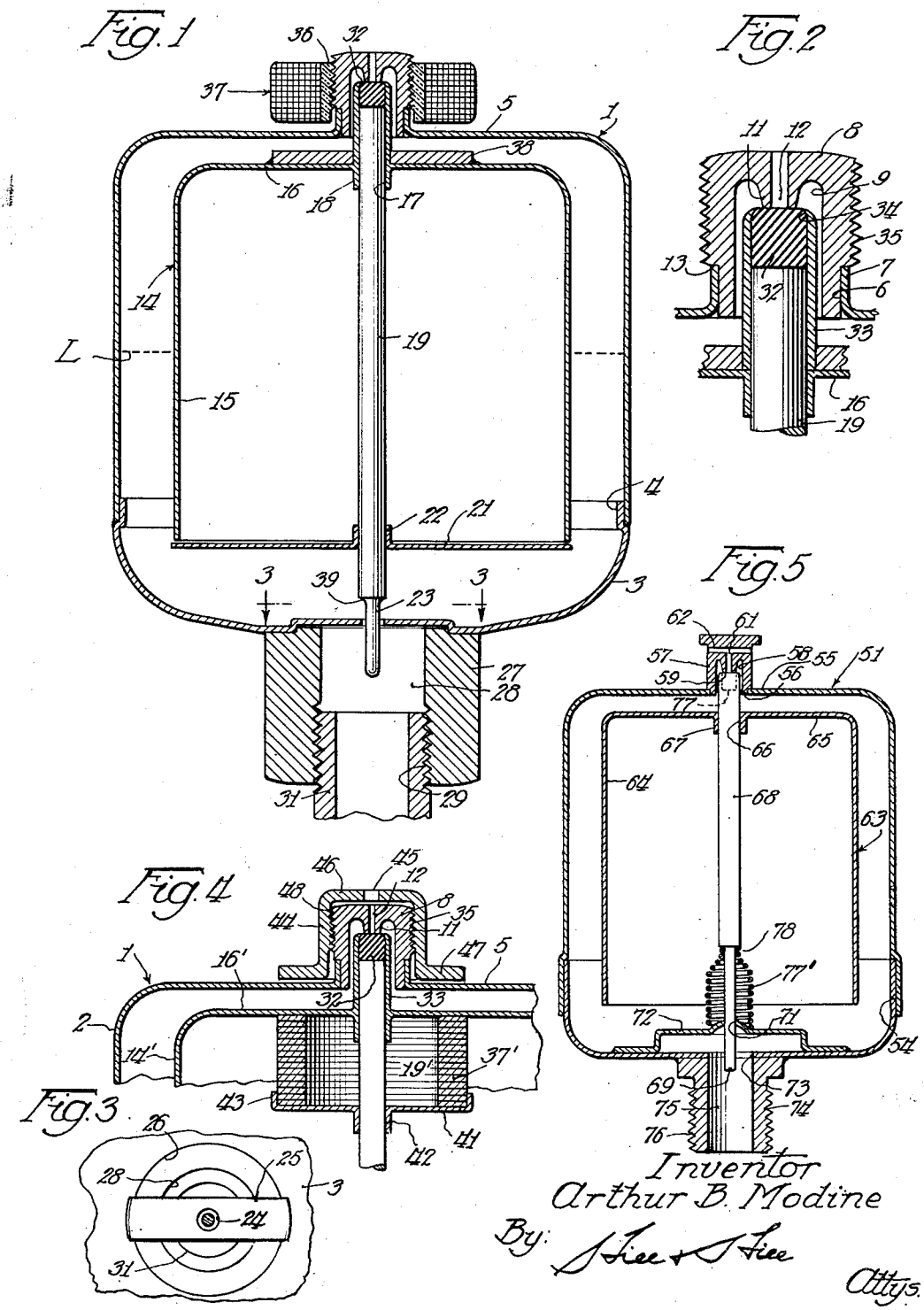
Inventor
Arthur B. Modine
By Hiee & Hiee
Attys.

United States Patent Office 2,708,944
Patented May 24, 1955

2,708,944

AIR RELIEF VALVE

Arthur B. Modine, Racine, Wis., assignor to Wiscon Products, Inc., Racine, Wis., a corporation of Wisconsin Application September 15, 1949, Serial No. 115,871

10 Claims. (Cl. 137—202)

The invention relates generally to valve structures, and more particularly to air relief valves, or the like.

The present invention is of particular use in connection with heating systems employing hot water or other liquid as the heating medium, and is adapted to vent air from the system, or portions thereof, to the atmosphere.

The invention has among its objects the production of a valve of the type described, which is exceedingly simple in construction, whereby the same may have only a single moving part, inexpensive to manufacture, and very efficient in operation.

Another object of the invention is the production of a valve in which the water or other liquid in the system does not come in contact with the valve structure or vent opening, whereby a relatively small vent orifice may be employed without danger of becoming plugged or clogged, and wherein a relatively small float may be employed to actuate the same, at the same time providing a sensitive valve structure that will efficiently operate on small differentials.

A further object of the invention is the production of such a valve construction in which gravity, internal pressure, buoyancy or displacements, and supplemental spring or magnetic forces may be employed in connection with the actuation of the valve, resulting in very efficient venting action which is substantially silent, and in which the closing action of the valve is extremely fast without lag or delay.

A further object of the invention is the production of such a valve structure by means of which springs, levers, and the like may be completely eliminated, and in which the action of the valve may be readily adjusted.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters represent like or corresponding parts:

Fig. 1 is a vertical sectional view through a valve embodying the present invention;

Fig. 2 is an enlarged sectional view of the valve seat and closure structure;

Fig. 3 is a sectional view taken approximately on the line 3—3 of Fig. 1;

Fig. 4 is a sectional view similar to Fig. 1 of the upper portion of a valve structure embodying a modification thereof; and Fig. 5 is a sectional view similar to Fig. 1, illustrating a modification of the present invention.

In the past there have been numerous types of air relief valves adapted to vent air from a system, as for example, a hot water heat system whereby air in the system may be trapped and expelled therefrom, thus increasing the efficiency of the system. While such valve structures normally employ a float member, the latter is usually connected through linkage to the actual valve structure. Present day types of hot water systems may operate under water pressures of twenty to thirty pounds or more, and it will be apparent that, as the water in the system normally will contain rust, sludge, and other similar materials, the contact of system water with the valve structure and vent orifice readily tends to impair efficient valve operation. Obviously, where link structures are employed to connect the float with the valve structure, a certain amount of lag is always present, and often such lag is sufficient to permit water to reach the valve structure. The present invention contemplates a valve structure which may employ substantially only a single movable element, which valve structure is so designed that the action thereof, particularly the closing action, is sufficiently rapid to insure closure of the air vent before liquid can rise into contact therewith.

Referring to the drawings, and particularly to Figs. 1, 2, and 3, the numeral 1 indicates generally a housing constructed, in the present instance, of light gauge metal, or the like, formed by spinning, drawing, or other suitable means, and having an upper section 2 of non-magnetic material, and a lower or base section 3, the latter having an inset peripheral flange 4 engaged with the lower edge of the upper section 2, and secured thereto by bonding, or other suitable means, for forming an airtight joint therebetween. The top 5 of the upper section is provided with an opening 6 therein formed with an outwardly extending annular flange 7, to which is bonded a cylindrical cap or stem 8. The latter has an axially extending bore 9 therein terminating at its inner end in an inverted valve seat 11 and vent opening 12. The member 8 is secured to the annular flange 7 of the housing by bonding, or the like, the cap being formed with a shoulder 13 seated upon the free edge of the flange 7, as clearly illustrated in Fig. 2.

Positioned in the housing 1 is a float, indicated by the numeral 14, illustrated in the present instance as being of the inverted bell type having a cylindrical side wall 15, and a top wall 16, the latter having an opening 17 therein bounded by an inwardly extending annular flange 18. The float 14 is mounted on a supporting rod 19 extending through the opening 17, with the annular flange 18 being bonded or soldered to the rod. The lower end of the float 14, in the embodiment of the invention illustrated, is open and covered by a disc 21 of light gauge sheet material formed with an annular flange 22, through which the rod 19 extends, the flange 22 being bonded or soldered to the rod 19. The lower end of the rod 19 is formed with a guide stem 23, in the present instance, of reduced diameter as compared with the diameter of the rod 19, and is positioned in an aperture 24 in a guide strip 25 formed from the bottom of the lower section 3 of the housing, the latter being cut away on opposite sides of the strip 25 to form openings 26 therein. Bonded or otherwise secured to the lower section 3 of the housing is an internally threaded sleeve 27 having a bore 28 provided with threads 29 adjacent its lower or outer end, providing means for connecting a pipe 31 to the housing, the bore 28 communicating through the openings 26 with the housing interior.

Positioned on the upper end of the rod 19 adjacent the valve seat 11 is a co-operating closure member 32 of suitable material, as for example, a suitable synthetic rubber or plastic. Surrounding the upper end of the rod 19 and the closure member 32 is a sleeve 33, the latter being secured to the rod by a press fit and having its free upper edges inturned, as indicated at 34, to firmly secure the closure member 32 in position on the end of the rod 19. The external diameter of the sleeve 33 is such that it is freely movable in the bore 9 of the member 8, permitting air to pass around the same and, at the same time, provides guiding means for the upper end of the float. Thus the latter is free to move substantially only in a vertical direction.

As illustrated in Fig. 2, the external side wall of the member 8 is provided with threads 35 adapted to receive a threaded sleeve 36 of plastic, or other suitable material, upon which is mounted an annular or ring-shaped permanent magnet, indicated generally by the numeral 37, the magnet 37 being rigidly secured to the sleeve 36 by any suitable means, as for example, a press fit. Mounted on the top 16 of the float 14 is a ring-shaped keeper member 38 of ferro-magnetic material, as for example, stainless steel, which may be rigidly secured to the float by bonding, or the like. The magnet 37 is preferably magnetized so that the two poles thereof are one hundred and eighty radial degrees apart, so that the keeper 38 tends to bridge the magnetic gap across the poles.

The operation of the device is as follows: Assuming the valve is operatively connected to a hot water heating system, as for example, to a suitable heat exchanger in such system, by means of the pipe 31, during operation of the device, the water in the system will rise to a normal level, such as the level L indicated in dotted lines in Fig. 1. At such level the displacement or buoyancy of the float will urge the latter upward, whereby the closure or sealing member 32 will engage the valve seat 11 and close the vent 12. This action is also supplemented by the magnetic attraction between the magnet 37 and keeper 38 through the non-magnetic upper section 3 of the housing, likewise tending to draw the float member upwardly and close the vent 12. As air rises through the pipe 31 into the housing, it will gradually force the water level L downward until a point is reached where the combined action of gravity and reduction in internal pressure in the float, as well as reduction in float displacement or buoyancy, will overcome the magnetic force exerted between the magnet 37 and keeper 38, so that the float will move downwardly slightly, disengaging the sealing member 32 from the valve seat 11, and permit air to escape through the vent 12. This action continues until the water level L rises to a point where the buoyancy and magnetic attraction are greater than the weight of the float, thereby raising the latter until the sealing member 32 seats on the valve seat 11 and closes the vent 12.

The closing action of the valve is extremely rapid, and sealing of the vent 12 takes place without any appreciable lag, so that even with a surge of water into the housing, the vent 12 is closed well before the water can rise into the contact with the sealing member 32, vent 12, and for that matter, with the top of the float. The strength of the magnetic field in the keeper 38 may be readily varied by rotating the sleeve 36 and magnet 37 to raise or lower the latter along the member 8, thus increasing or diminishing the air gap between the magnet and the keeper. The shield 21 extending across the lower open end of the float 14 is operative merely to prevent air rising in the pipe 31 from being trapped within the float, and to prevent a capillary attraction if the water level dropped to adjacent the bottom of the float. Capillary attraction between the bottom of the float and the lower section 3 of the housing is eliminated by the shoulder 39, formed by the juncture of the stem 23 with the rod 19, which will engage the guide strip 25, limiting downward movement of the float relative to the housing, and preventing the float from resting on the lower section. Due to the combined forces acting on the float, the action of the valve is very smooth, as contrasted with previous devices where relatively sharp intermittent opening and closing action takes place, so that the valve will normally open very slightly to permit the air to slowly and silently pass through the vent 12. In other words, the valve will operate on very low air differentials, so that in normal operation only small amounts of air are vented, and the discharge of large amounts of air and attendant noise resulting therefrom is eliminated. In the event, for any reason, a large amount of air did accumulate, the valve would fully open to permit the discharge thereof.

The construction illustrated in Fig. 4 is similar to that illustrated in Figs. 1 and 2, with the exception that the magnet and keeper are reversed, so that the magnet is carried by the float and the keeper is mounted on the housing. Thus the annular shaped magnet 37' is positioned within the float member 14' adjacent the inner surface of the top 16' thereof, which in this construction would be constructed of non-magnetic material, the magnet being supported by a disc 41 having an annular flange 42 secured to the rod 19', the peripheral edge of the disc 41 terminating in an upwardly extending annular flange 43, which encircles the lower portion of the magnet 37', securely maintaining the magnet in position. Secured to the top 5 of the upper section 2 of the housing 1, likewise of non-magnetic material, is the member 8 having vent 12, valve seat 11, and external threads 35. In this construction the keeper is constructed in the shape of an inverted cup-like sleeve 44 having an aperture 45 in the end portion 46 thereof, and provided with an annular outwardly extending flange 47 positioned opposite the magnet 37', with the interior of the sleeve portion 44 being provided with threads 48 adapted to be engaged with the threads 35 on the member 38. Thus by rotating the keeper sleeve relative to the member 8, the annular flange 47 may be raised or lowered with respect to the float and magnet 37', thereby varying the air gap between the magnet and the keeper.

The operation of the construction illustrated in Fig. 4 is substantially the same as that described in connection with the structure illustrated in Figs. 1, 2, and 3, and it will be apparent that the strength of the magnetic field adjacent the keeper may be readily varied, as desired.

While I have provided, in both of the constructions illustrated, an adjustment of the strength of the magnetic field at the keeper, in certain applications of the invention it may be desirable to rigidly mount both the magnet and keeper on their respective supporting members to provide a predetermined relationship therebetween. Obviously, if the adjustability is not desired, the supporting member which would carry the magnet keeper, or a portion thereof, could be constructed of a ferromagnetic material, with the magnet being so mounted on the other member as to provide the desired magnetic field.

The embodiment of the invention illustrated in Fig. 5, in general, is similar to those heretofore described and includes a housing, indicated generally by the numeral 51, having an upper section 52 and a lower section 53, with their adjacent edges bonded, or otherwise suitably connected, as indicated at 54, to form an air-tight joint therebetween. The top 55 of the upper section is provided with an opening 56 therein in which is bonded a cylindrical cap or stem 57. The latter has an axially extending bore 58 therein terminating at its inner end in an inverted valve seat 59 and vent opening 61 communicating with the exterior through the transverse bore 62.

Positioned in the housing 51 is a float, indicated by the numeral 63, illustrated in the present instance as being of the inverted bell type having a cylindrical side wall 64, and a top wall 65, the latter having an opening 66 therein bounded by an inwardly extending annular flange 67. The float 63 is mounted on a supporting rod 68 extending through the opening 66, with the annular flange 67 being bonded or soldered to the rod. The lower end of the rod 68 is formed with a guide stem 69, in the present instance of reduced diameter as compared with the diameter of the rod 68, and is positioned in an aperture 71 in a guide strip 72 secured to the bottom of the lower section 53 of the housing, the latter being provided with an opening 73 therein. Bonded or otherwise secured to the lower section 53 of the housing is a sleeve 74 having a bore 75 provided with external threads 76 adjacent its lower or outer end, providing means for connecting the housing to a heat exchanger, or the like, the bore 75 communicating through the opening 73 with the housing interior.

The upper end of the rod 68 extends into the bore 58 of the stem 57, and carried by the rod at its upper end is a closure member 77 corresponding to the member 32 and adapted to engage and seal the valve seat 59.

Encircling the upper portion of the guide stem 69 is a compression spring 77', the upper end of which is of reduced diameter and seated upon the shoulder 78 formed by the juncture of the stem with the body of the rod 68. The offset end of the spring 77 is seated upon the guide strip 72, the latter preferably being dished upwardly adjacent the opening 71 to provide means for maintaining the lower end of the spring 77 in alignment with the stem 68.

The general operation of the structure illustrated in Fig. 5 is similar to that heretofore described in connection with the structures illustrated in Figs. 1 to 4, with the exception that the natural forces of buoyancy, gravity, and pressures acting on the float 63 are supplemented by the action of the spring 77 instead of the magnetic attraction between the magnet and keeper. The characteristics of the spring 77 are so selected that a desired supplemental closing force is applied to the closure elements, thus insuring efficient sealing; at the same time permitting the closure elements to open when the water level in the housing falls below a pre-determined level, venting the trapped air therein.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. In a valve structure, the combination of a housing member having a float chamber, a vertically movable float member positioned in said chamber, guide means for said float member, said housing member having a vent in the top thereof in axial alignment with the float member, a closure element carried by said float at the top thereof and in axial alignment with the float and adapted to close said vent when the float member is in a raised position and open the vent when the float member is in a lowered position, and means in axial alignment with the float for applying a magnetic force to said float member in a direction tending to raise the latter relative to the housing member, including a permanent magnetic element carried by said float and a ferromagnetic element carried by the housing exteriorly thereof and positioned within the magnetic field of said magnet.

2. In a valve structure, the combination of a housing member having a float chamber, a vertically movable float member positioned in said chamber, guide means for said float member, said housing member having a vent in the top thereof in axial alignment with the float member, a closure element carried by said float at the top thereof in axial alignment with the float and adapted to close said vent when the float member is in a raised position and open the vent when the float member is in a lowered position, and means for applying a magnetic force to said float member in a direction tending to raise the latter relative to the housing member, including a permanent magnet element carried by said float and a ferromagnetic element carried by the housing exteriorly thereof and positioned within the magnetic field of said magnet, said ferromagnetic element being movable relative to the housing member to provide an adjustment of the strength of the magnetic field applied to the ferromagnetic element, and each of said elements in axial alignment with the float member.

3. In a valve structure, the combination of a housing member having a float chamber, a vertically extending guide rod positioned in said chamber, means carried by said housing adjacent the ends of said rod for guiding the same for axial movement relative to the housing, a float member carried by said rod, said housing member having a vent in the top thereof axially aligned with said rod, an inverted valve seat surrounding said vent carried by said housing member, a closure element carried by the upper end of said rod and adapted to engage the valve seat and close said vent when the float member is in a raised position and uncover said seat and open the vent when the float member is in a lowered position, a ring-shaped permanent magnet element carried by one of said members and axially aligned with said rod, and a ring-shaped ferromagnetic element carried by the other member and axially aligned with said rod and positioned within the field of said magnet.

4. In a valve structure, the combination of a housing member having a float chamber, a vertically extending guide rod positioned in said chamber, means carried by said housing adjacent the ends of said rod for guiding the same for axial movement relative to the housing, a float member carried by said rod, said housing member having a vent in the top thereof axially aligned with said rod, an inverted valve seat surounding said vent carried by the upper end of said rod and adapted to engage the valve seat and close said vent when the float member is in a raised position and uncover said seat and open the vent when the float member is in a lowered position, a ring-shaped permanent magnet element caried by said housing member and axially aligned with said rod, and a ring-shaped ferromagnetic element carried by said float member and axially aligned with said rod and positioned within the field of said magnet.

5. In a valve structure, the combination of a housing member having a float chamber, a vertically extending guide rod positioned in said chamber, means carried by said housing adjacent the ends of said rod for guiding the same for axial movement relative to the housing, a float member carried by said rod, said housing member having a vent in the top thereof axially aligned with said rod, an inverted valve seat surrounding said vent carried by said housing member, a closure element carried by the upper end of said rod and adapted to engage the valve seat and close said vent when the float member is in a raised position and uncover said seat and open the vent when the float member is in a lowered position, a ring-shaped permanent magnet element carried by said float member and axially aligned with said rod, and a ring-shaped ferromagnetic element carried by said housing member and axially aligned with said rod and positioned within the field of said magnet.

6. In a valve structure, the combination of a housing member having a float chamber, a vertically extending guide rod positioned in said chamber and axially movable therein, means for guiding the lower end of said rod, a float member carried by said rod, a hollow cap mounted on the top of said housing member and having a vent in the top thereof communicating with the float chamber and axially aligned with said rod, the upper end of the latter being positioned in said cap and adapted to be guided thereby, an inverted valve seat surrounding said vent carried by said cap, a closure element carried by the upper end of said rod and adapted to engage the valve seat and close said vent when the float member is in a raised position and uncover said seat and open the vent when the float member is in a lowered position, a ring-shaped permanent magnet element carried by one of said members and axially aligned with said rod, and a ring-shaped ferromagnetic element carried by the other member axially aligned with said rod and positioned within the magnetic field of said magnet element.

7. In a valve structure, the combination of a housing member having a float chamber, a vertically extending guide rod positioned in said chamber and axially movable therein, means for guiding the lower end of said rod, a float member carried by said rod, a hollow cap member mounted on the top of said housing member and having a vent in the top thereof communicating with the float chamber and axially aligned with said rod, the upper end of the latter being positioned in said cap member and adapted to be guided thereby, an inverted valve seat surrounding said vent carried by said cap member, a closure element carried by the upper end of said rod and adapted to engage the valve seat and close said vent when the float member is in a raised position and uncover said seat and open the vent when the float member is in a lowered position, a ring-shaped permanent magnet element carried by said housing member and surrounding said cap member, and a ring-shaped ferromagnetic element carried by the float member, surrounding said rod and positioned within the magnetic field of said magnetic element.

8. In a valve structure, the combination of a housing member having a float chamber, a vertically extending guide rod positioned in said chamber and axially movable therein, means for guiding the lower end of said rod, a float member carried by said rod, a hollow cap member mounted on the top of said housing member and having a vent in the top thereof communicating with the float chamber and axially aligned with said rod, the upper end of the latter being positioned in said cap member and adapted to be guided thereby, an inverted valve seat surrounding said vent carried by said cap member, a closure element carried by the upper end of said rod and adapted to engage the valve seat and close said vent when the float member is in a raised position and uncover said seat and open the vent when the float member is in a lowered position, a ring-shaped permanent magnet element carried by said float member and surrounding said rod, and a ring-shaped ferromagnetic element carried by the housing member, surrounding said cap member and positioned within the magnetic field of said magnet element.

9. In a valve structure, the combination of a housing member having a float chamber, a vertically extending guide rod positioned in said chamber and axially movable therein, means for guiding the lower end of said rod, a float member carried by said rod, a cylindrically shaped, externally threaded, hollow cap member mounted on the top of said housing member and having a vent in the top thereof communicating with the float chamber and axially aligned with said rod, the upper end of the latter being positioned in said cap member and adapted to be guided thereby, an inverted valve seat surrounding said vent carried by said cap member, a closure element carried by the upper end of said rod and adapted to engage the valve seat and close said vent when the float member is in a raised position and uncover said seat and open the vent when the float member is in a lowered position, a ring-shaped internally threaded sleeve of non-magnetic material having its threads engaged with the threads on said cap member, a permanent magnet element carried by and concentrically positioned with respect to said sleeve, and a ring-shaped ferromagnetic element carried by the float member, surrounding said rod and positioned within the magnetic field of said magnet element.

10. In a valve structure, the combination of a housing member having a float chamber, a vertically extending guide rod positioned in said chamber and axially movable therein, means for guiding the lower end of said rod, a float member carried by said rod, a cylindrically shaped, externally threaded, hollow cap member mounted on the top of said housing member and having a vent in the top thereof communicating with the float chamber and axially aligned with said rod, the upper end of the latter being positioned in said cap member and adapted to be guided thereby, an inverted valve seat surrounding said vent carried by said cap member, a closure element carried by the upper end of said rod and adapted to engage the valve seat and close said vent when the float member is in a raised position and uncover said seat and open the vent when the float member is in a lowered position, a ring-shaped permanent magnet element carried by said float member and surrounding said rod, and an internally threaded, ring-shaped ferromagnetic element, having its threads engaged with the threads on said cap member positioned within the magnetic field of said magnet element.

References Cited in the file of this patent

UNITED STATES PATENTS

| | | |
|---|---|---|
| 248,877 | Osborne | Nov. 1, 1881 |
| 338,196 | Smith | Mar. 16, 1886 |
| 579,865 | Eider | Mar. 30, 1897 |
| 710,480 | Loetzer | Oct. 7, 1902 |
| 1,332,997 | Reiben | Mar. 9, 1920 |
| 1,606,356 | Fisher | Nov. 9, 1926 |
| 1,611,398 | Wiggins | Dec. 21, 1926 |
| 1,611,458 | Kempkey | Dec. 21, 1926 |
| 2,179,750 | McCracken | Nov. 14, 1939 |
| 2,251,086 | Van Dyke | July 29, 1941 |
| 2,371,830 | Langden | Mar. 20, 1945 |
| 2,387,858 | Russel | Oct. 30, 1945 |
| 2,494,395 | Landon | Jan. 10, 1950 |
| 2,519,578 | Jimenex | Aug. 22, 1950 |

FOREIGN PATENTS

| | | |
|---|---|---|
| 212,570 | Germany | Aug. 5, 1909 |
| 225,826 | Germany | 1910 |
| 589,617 | Germany | Dec. 11, 1933 |
| 2,845 | Great Britain | 1914 |